United States Patent [19]

Chauveau

[11] Patent Number: 4,864,566

[45] Date of Patent: Sep. 5, 1989

[54] PRECISE MULTIPLEXED TRANSMISSION AND RECEPTION OF ANALOG AND DIGITAL DATA THROUGH A NARROW-BAND CHANNEL

[75] Inventor: Claude J. Chauveau, Lake Oswego, Oreg.

[73] Assignee: Cycomm Corporation, Portland, Oreg.

[21] Appl. No.: 912,363

[22] Filed: Sep. 26, 1986

[51] Int. Cl.$^4$ .............................................. H04J 3/00
[52] U.S. Cl. ..................................... 370/109; 381/34; 370/110.1
[58] Field of Search ................. 370/109, 112, 118, 11, 370/81, 110.1; 381/34; 375/122

[56] References Cited

U.S. PATENT DOCUMENTS

| | | | |
|---|---|---|---|
| 3,718,766 | 2/1973 | Storer | 370/11 |
| 4,300,161 | 11/1981 | Haskell | 370/109 |
| 4,593,318 | 6/1986 | Eng et al. | 370/109 |

FOREIGN PATENT DOCUMENTS 3332661  2/1985  Fed. Rep. of Germany ...... 370/109

Primary Examiner—Douglas W. Olms
Assistant Examiner—Frank M. Scutch, III
Attorney, Agent, or Firm—Fliesler, Dubb, Meyer & Lovejoy

[57] ABSTRACT

A data transfer system is described for transferring analog data from a source to a destination by treating the analog data as a continuous series of segments sequentially compressing segments of the analog data and then multiplexing the compressed analog data with analog encoded digital data including synchronization data. The resultant multiplexed data stream is then provided to a data channel for transfer. The synchronization data included with the analog encoded digital data is used to resynchronize the demultiplexer of a receiver receiving the multiplexed data stream. The analog encoded digital data is demultiplexed and demodulated while the analog data is decompressed to realize again the continuous analog data stream as originally provided to the data source.

37 Claims, 9 Drawing Sheets

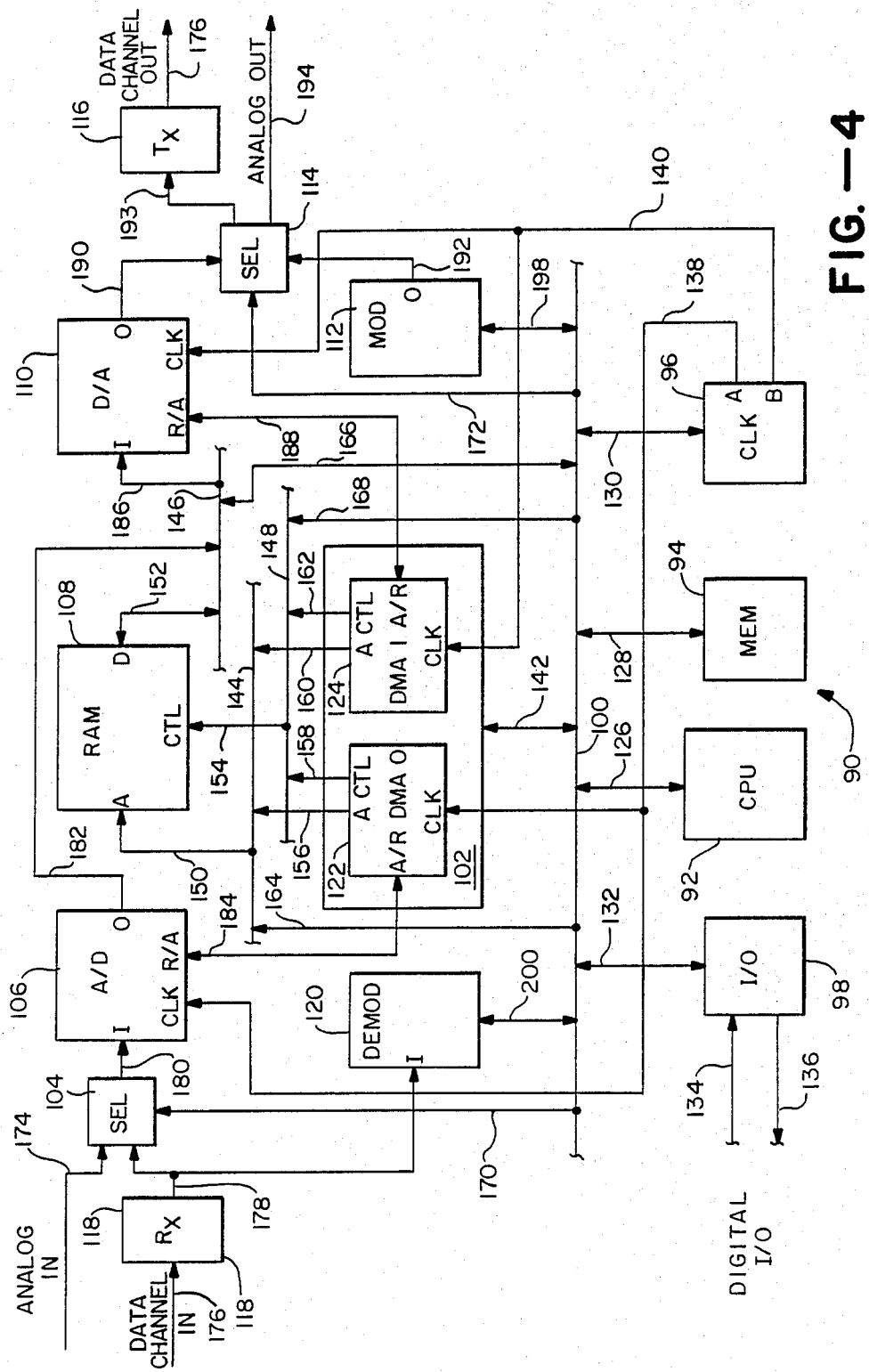
FIG.—4

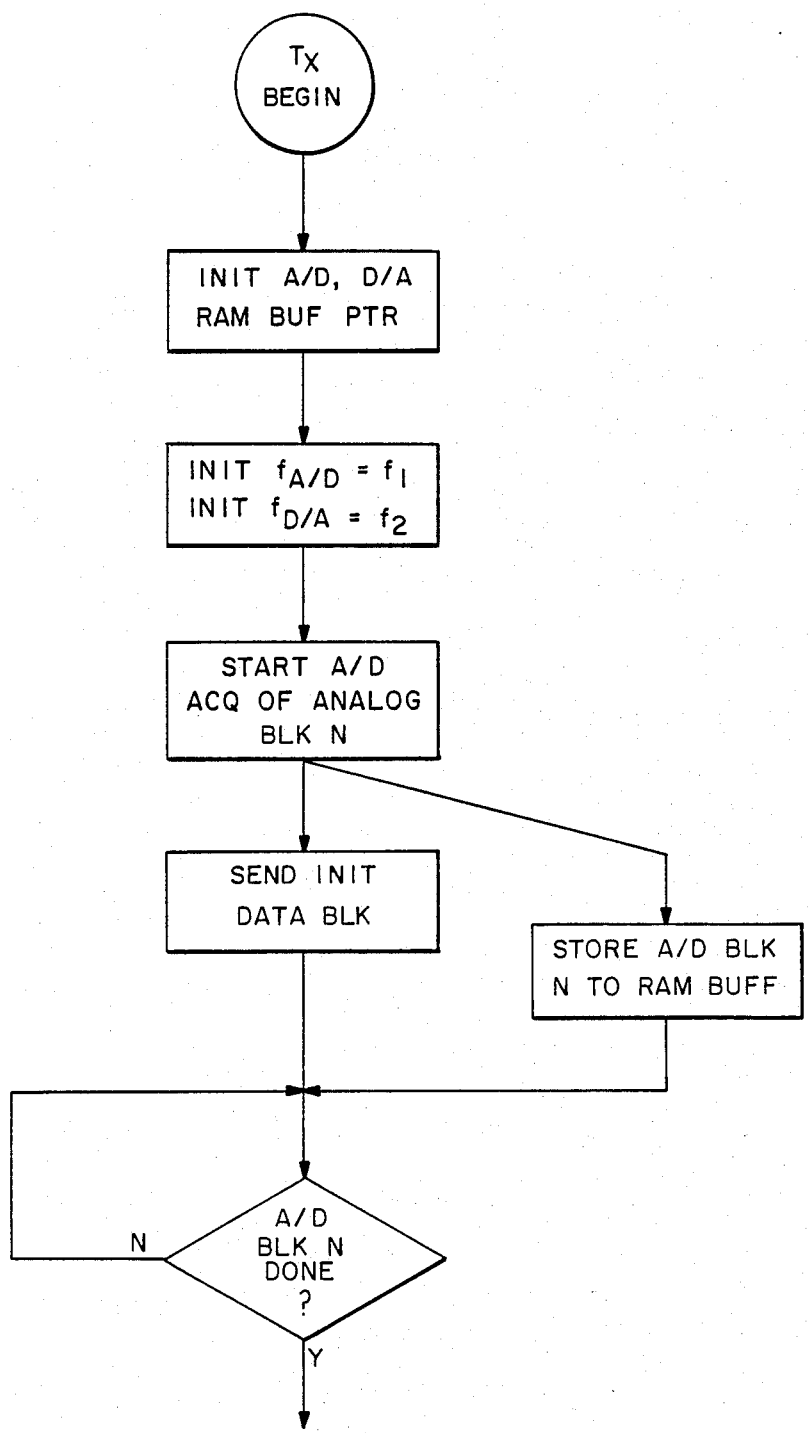
FIG.—6a

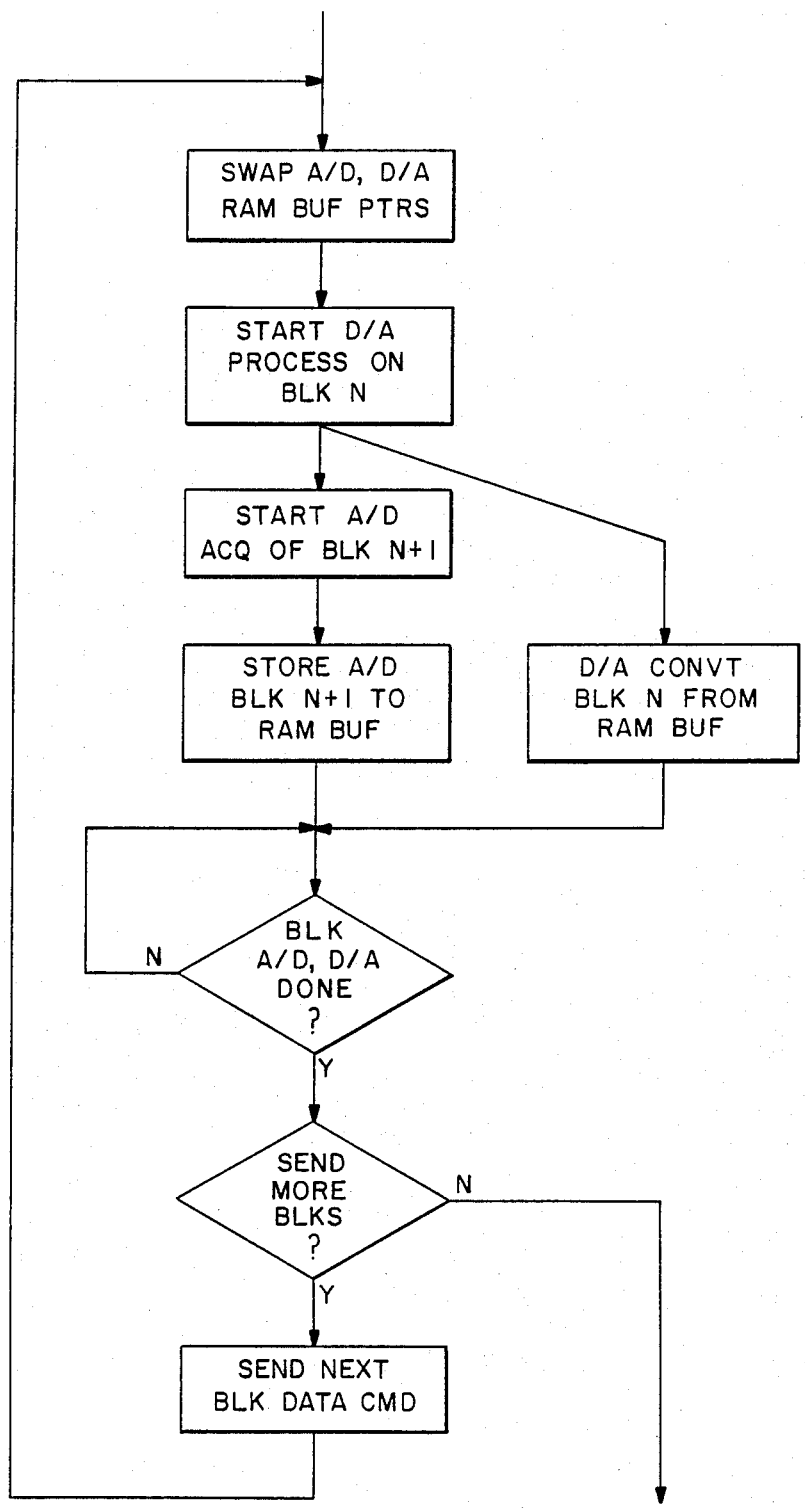
FIG.—6b

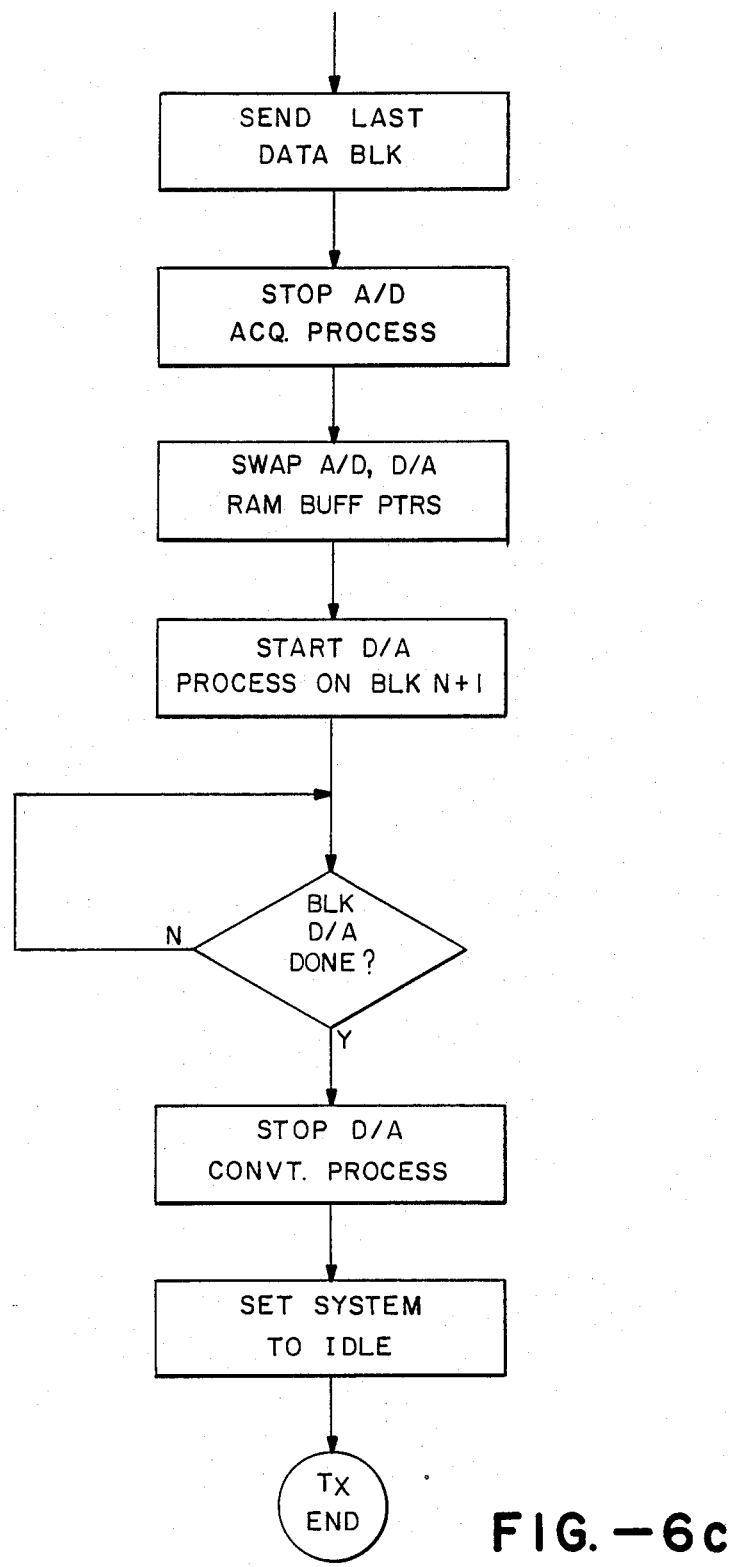
FIG.—6c

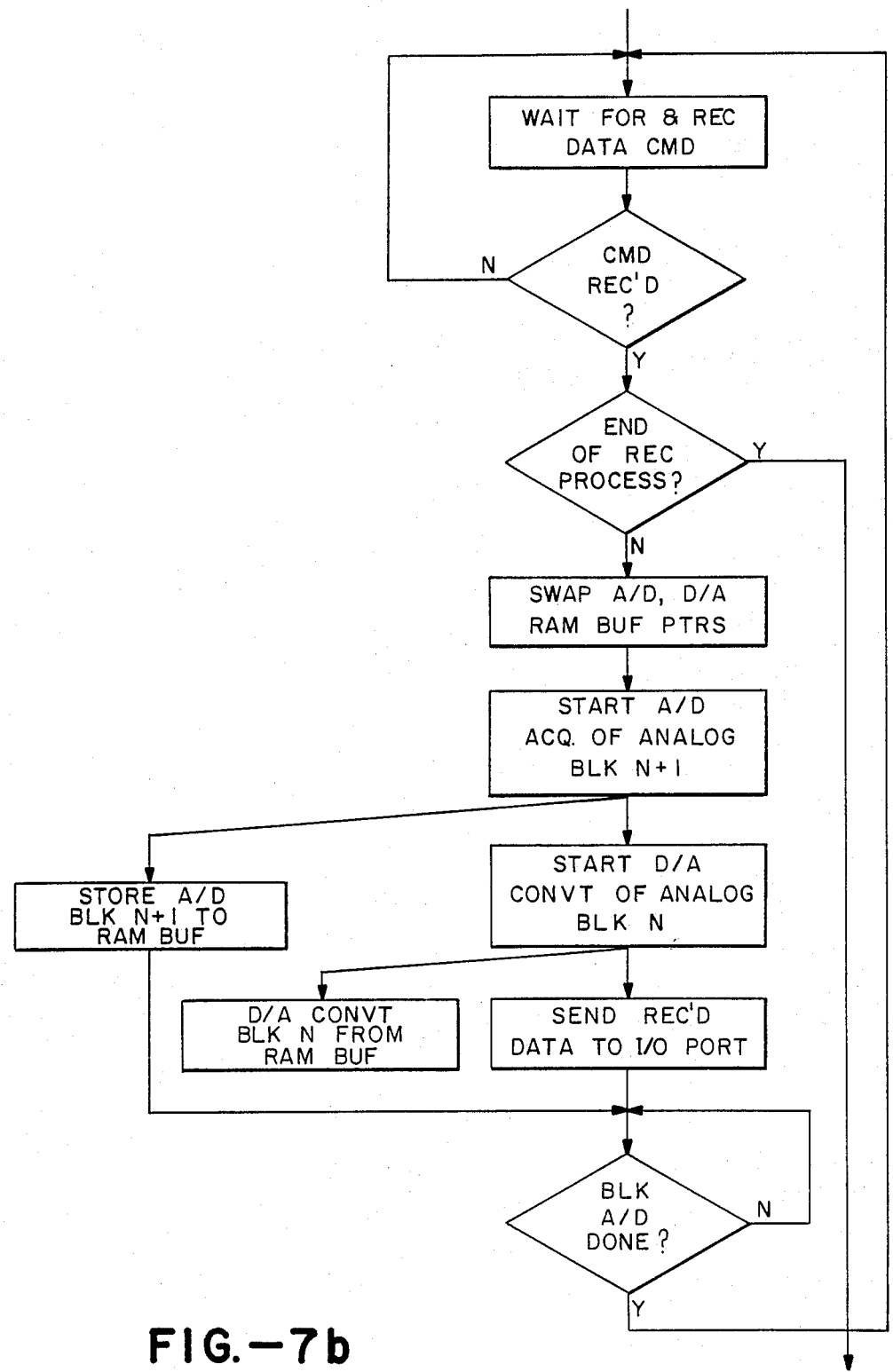
FIG.—7b

PRECISE MULTIPLEXED TRANSMISSION AND RECEPTION OF ANALOG AND DIGITAL DATA THROUGH A NARROW-BAND CHANNEL

FIELD OF THE INVENTION

The present invention generally relates to the field of real time analog data communications and, in particular, to the communication of continuous analog data in combination with other data, including analog encoded digital data, in a common data channel.

BACKGROUND OF THE INVENTION

In the continuing development and expansion of the communication related fields, there is a continuing need to improve upon the accuracy and rate of information transfer. An often encountered limitation is that various data communication channel networks have already been established. For practical and economic reasons, any improvement in the rate or accuracy of information transfer is distinctly preferred if they can be made while remaining fully compatible with the existing channel network to which they apply.

The nature of the information transferred also substantially constrains the manner that any improvements in rate or accuracy can be obtained. For example, many improvements have been made in the analog encoding schemes utilized for the simple transmission of digital data through a data channel of a network defined bandwidth. Maintaining transfer accuracy requires that the encoding scheme maintain an adequate level of noise immunity depending on the form of encoding used, whether the common frequency shift key (FSK) or any of the phase-shift techniques. These encoding techniques improve the rate of data transfer by increasing the data representation density of the analog waveform, but without significantly increasing the required waveform bandwidth. Thus, greater rates of data can be accurately transferred within the constraining maximum bandwidth of the data channel.

Continuous analog data is another common form of information that is widely communicated through the existing channel networks. An example of "continuous" analog data is, of course, the human voice. Conventional techniques provide quite well for the accurate transfer of such continuous analog data. A distinct problem arises, however, when there is a need to transfer some additional data through the analog data channel at the same time that the continuous analog data is being transferred. Conventional multiplexing of the real time analog data with the additional data immediately incurs two significant disadvantages. The first is that, due to the continuous nature of the analog data, portions are lost each time the additional data is multiplexed into the data channel for transfer. In a practical sense, this loss is acceptable if the multiplex ratio of continuous analog data being multiplexed into the data channel as opposed to the additional data must be such that the loss of real time analog data is minimal. Unfortunately, where the loss of real time analog data is acceptably low, the quantity of additional data that can be multiplexed into the data channel is correspondingly minimized, if not made insignificant. Depending on the particular application in which the real time analog data is being utilized, and the minimum worthwhile rate of additional data being provided through the data channel, either the accuracy of the real time analog data or the rate of the additional data, or both, must be compromised.

The second problem involves the underlying requirement that the demultiplexer at the receiver end of the data channel be closely synchronized with the transmitter end multiplexer in order to accurately separate the transmitted continuous analog and additional data. Therefore, some mechanism is required to initially synchronize and thereafter maintain the synchronization of the respective multiplexer and demultiplexer time bases. One conventional synchronization scheme provides for an initial alignment of the two time bases prior to the beginning of the entire continuous analog data transfer. This method presumes that the continuous analog data naturally occurs as separate messages, each otherwise continuous. This scheme implicitly requires that the transmitter and receiver time bases be of sufficient accuracy, independent of one another, that there is no more than some very minimal amount of drift or relative time difference between the two time bases for the duration of the entire message. Such an "open loop" time base multiplexer/demultiplexer system is typically quite expensive where the messages are long. Artificially shortening the messages by multiplexing in further time base initialization data directly and undesirably impacts the accuracy of the reconstruction of the continuous analog data.

An alternate, conventional synchronization scheme provides for the continuous synchronization of the respective multiplexer and demultiplexer time bases. This type of synchronization scheme is often described as "closed-looped". This alternate scheme superimposes a clock signal onto the analog data at the transmitter for recovery by the receiver. However, a notch filter or the like must be used to erase the clock signal form the analog data. This erasure does not occur without the loss of similar frequency data from the analog data and, therefore, loss of accuracy in the transfer of the analog data.

Thus, there is a need for a communication system that provides for the accurate transfer of continuous analog data in combination with an at least adequate rate of additional data, all transferred within a typically narrow band, communication network data channel.

SUMMARY

This is accomplished in the present invention through the use of a data transfer system for transferring first data from a source to a destination that compresses respective segments of the first data prior to multiplexing with additional analog data and providing the resultant multiplexed data stream to a communication network data channel for transfer.

The present invention further provides for a demultiplexer that separates the compressed data from the additional data. The demultiplexer time base is continually reinitialized on receipt of each demultiplexed block of additional data. This resynchronization allows the subsequent, accurate demultiplexing of the compressed data from the multiplexed data stream. The compressed data is then decompressed to very accurately yield data matching the first data originally provided to the data transfer system.

An advantage of the present invention is, therefore, that it achieves a precise, nearly closed loop time base synchronization relationship between the multiplexer and demultiplexer. Since the additional data is time-multiplexed with compressed data, where the compression of the first data opens a time window equal to or greater than the multiplexed time allocated to the additional data, there is no loss of any analog data information.

Another advantage of the present invention is that it allows additional data to be multiplexed with the compressed data without significantly compromising the accuracy of analog data transferred. The nominal constraint associated with the present invention is the degree of compression that can be performed on the first data without exceeding the bandwidth limitations of the narrow band data channel, though rather less significant than a direct loss of accuracy as is associated with conventional techniques.

BRIEF DESCRIPTION OF THE DRAWINGS

These and other attendant advantages and further features of the present invention will become apparent and readily appreciated as the same becomes better understood by reference by the following detailed description of the invention when considered in connection with the accompanying drawings, in which like reference numerals designate like-parts throughout the figures thereof, and wherein:

FIG. 4 provides a detailed block diagram of a preferred half-duplex transceiver embodiment of the present invention;

FIGS. 6a-c provide a software flow diagram illustrating the transmit mode operation of the preferred embodiment of the present invention shown in FIG. 5; and FIGS. 7a-c provide a software flow diagram illustrating the receive mode operation of the preferred embodiment of the present invention shown in FIG. 5.

DETAILED DESCRIPTION OF THE INVENTION

Figure 1:
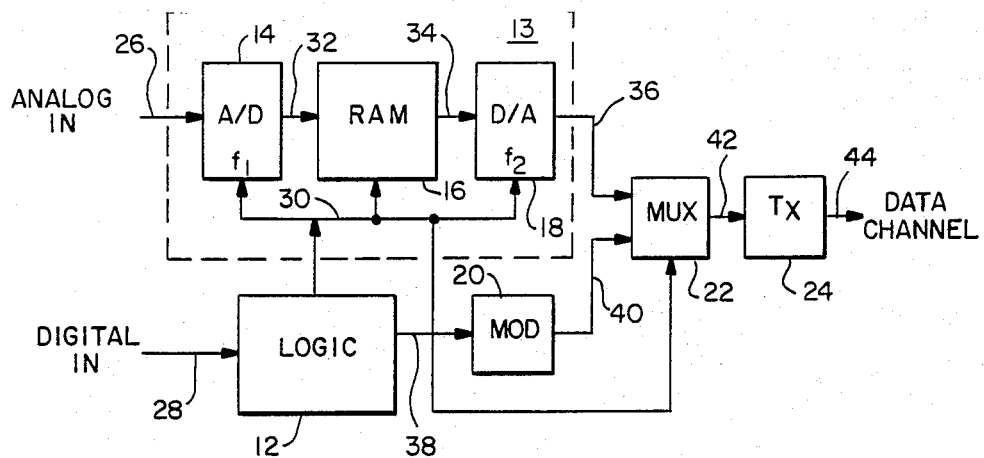
FIG. 1 provides a simplified block diagram of a transmitter unit of a preferred embodiment of the present invention.
Figure 2:
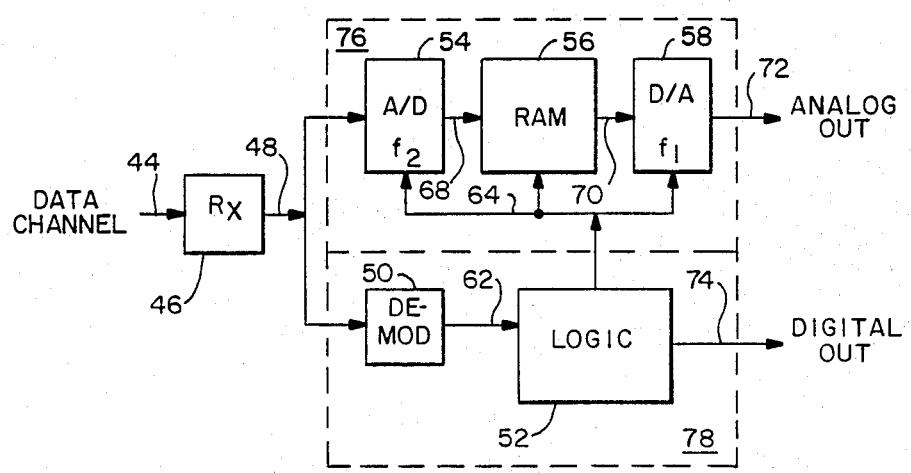
FIG. 2 provides a simplified block diagram of a receiver unit of a preferred embodiment of the present invention.

The present invention provides for the effective transmission of combined analog and analog encoded digital data through a narrow-band communications data channel. A simplified block diagram of a transmitter unit, generally indicated by the reference numeral 10 and illustrating a preferred embodiment of the present invention, is shown in FIG. 1. A simplified block diagram of a receiver unit, generally identified by the reference numeral 80 also illustrating a preferred embodiment of the present invention, is shown in FIG. 2. The transmitter and receive units 10,80, connected through a conventional data channel 44, together provide a complete system for the accurate transfer of both continuous analog and analog encoded digital data provided to the transmitter unit 10 to be received and precisely reconstructed by the receiver unit 80.

Referring now to FIG. 1, analog data of a nature conventionally transferred through the communications data channel 44 is provided on an analog input line 26 of the transmitter unit 10. The analog data provided on the input line 26 can be typically characterized as continuous variable length message data, such as exemplified by a human voice analog data source. Thus, a principle constraint on the transfer of the analog data is that it be accurately reproduced when output by the receiver unit 80 (i.e., with minimal distortion and no dropouts).

Digital data is provided to the transmitter unit 10 on a digital input line 28. The digital data so provided is to be transferred concurrently with the analog data to the receiver unit 80 through the same communications data channel 44 without improperly affecting other communication data channels typically adjacent to the channel 44. The transmitter unit 10 accomplishes this by analog encoding the digital data, effectively multiplexing the analog and analog encoded digital data and then providing the resultant multiplexed data stream to the communications data channel 44. However, in order to achieve the accurate transfer of the analog data, the transmitter unit 10 first frequency compresses the analog data stream into compressed analog data segments prior to being multiplexed with the analog encoded digital data.

The transmitter unit 10 fundamentally includes an analog data processing block 13, that in turn, includes an analog to digital converter 14, a memory block 16 and a digital to analog converter 18. The transmitter also includes a logic circuit 12 for receiving the digital data and a modulator 20 for encoding an analog signal with the digital data. The analog data outputs of the analog block 13 and modulator 20 are multiplexed together by a multiplexer 22 and provided to a transmitter 24 for final processing before being placed into the communications data channel 44. The transmitter 24 is preferably the conventional interface component utilized to process and place analog data into the specific communication network data channel 44. Accordingly, the transmitter 24 may be a conventional radio transmitter, electrical cable connector, electro-optic converter and fiber optic connector, or telecom switch.

Figure 3A:
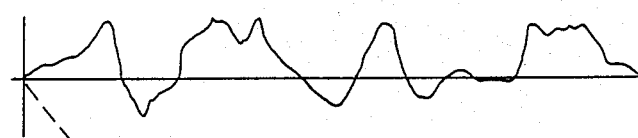
FIGS. 3a-e provide illustrative waveforms of the compression, multiplexing, demultiplexing and decompression of the data as processed in accordance with the present invention.

FIG. 3a illustrates a typical analog waveform that might typically be provided to the transmitter unit 10 on its analog input line 26. Referring again to FIG. 1, the analog to digital converter 14 operates from a reference frequency $f_1$ determined and provided by the logic circuit 12 via the timing and control lines 30. The reference frequency $f_1$ establishes the rate of analog to digital conversions performed by the analog to digital converter 14. The resultant digital samples are sequentially provided to the RAM block 16 for temporary storage. The logic block 12 further provides a second reference frequency $f_2$ to the digital to analog converter 18. The reference frequency $f_2$ determines the rate that the temporarily stored digital samples are accessed from the RAM block 16 via data lines 34 and converted to their corresponding analog value by the digital to analog converter 18. By specifying a difference in frequency between reference frequencies $f_1$ and $f_2$ such that $f_2$ is greater than $f_1$, the analog data waveform of FIG. 3a is compressed. The degree of compression directly corresponds to the ratio of $f_1$ to $f_2$.

Figure 3B:
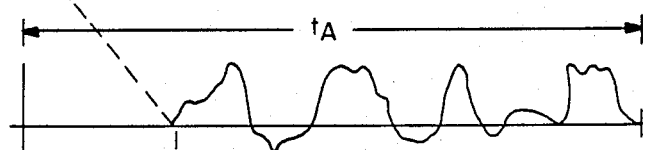
Figure 3C:
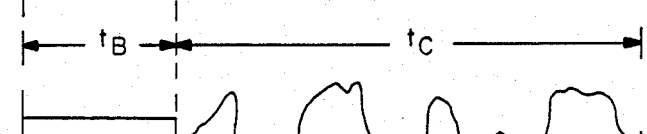
Figure 3D:
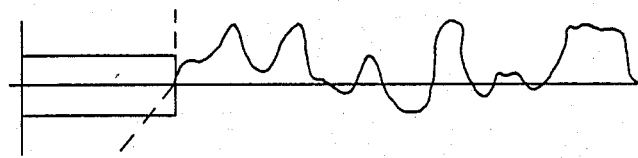

Since the conversion rate of the digital to analog converter 18 is greater than that of the analog to digital converter 14, the analog data stream received on line 26 is treated as a continuous series of analog data segments of a predetermined length. As shown in FIG. 3a, the analog data segment is represented as having a segment length of $t_A$. FIG. 3b illustrates the analog data waveform segment of FIG. 3a after compression. Thus, the analog data segment length is reduced to $t_C$, leaving a time window $t_B$ open with respect to the period of the original analog data segment $t_A$. The open time window $t_B$ is utilized by the logic circuit 12, in accordance with the present invention, for transferring the analog encoded digital data into the network communications channel 44. That is, the digital data received on the digital input lines 2 is passed to the modulator 20 via lines 38 for encoding as an analog waveform. The resultant analog encoded data produced by the modulator 20 is provided to the multiplexer 22 via the multiplexer input line 40. Selection of a respective multiplexer input line 36, 40 is closely controlled by the logic circuit 12, via control lines 30, so as to accurately multiplex select the analog encoded digital data during the open time window $t_B$. The multiplexer 22 otherwise selects the compressed analog data segment provided by the digital to analog converter 18 on the selector input line 36. The resulting multiplexed compressed analog data and analog encoded digital data, occupying the equivalent of one analog segment period, is shown in FIG. 3c. A continuous analog data stream is therefore provided from the multiplexer 22 to the transmitter 24 and subsequently provided into the data channel 44.

Referring now to FIG. 2, the receiver 46 initially receives the multiplexed data stream from the communications data channel 44. The receiver 46 is also preferably the conventional component typically used for initially receiving the analog data from the communications data channel 44. Typical receivers 46 include a radio receiver, electrical cable connector, opto-detector and optical fiber connector, or a telecom switch. In any case, the receiver 46 provides the received multiplexed analog data stream onto the receiver output line 48 in common to an analog block 76 and a digital logic block 78 of the receiver unit 80. The logic block 78 includes a demodulator 50 and a logic circuit 52. The demodulator 50, upon receiving a valid analog encoded digital data input from the receiver 46, extracts and provides the digital data to the logic circuit 52 by way of the digital data lines 62. The logic circuit 52 in turn provides the digital data onto the digital output bus 74.

The logic circuit 52 also functions to control the operation of the analog block 76. By directly receiving the digital data by the demodulator 50, the logic circuit 52 is able to accurately determine when to effectively demultiplex the compressed analog data segment from the multiplexed analog stream as provided from the receiver output line 48. That is, the demultiplexing selection of the analog block 76 occurs at a predetermined period of time following either the beginning or conclusion of the receipt of the analog encoded digital data. Alternately, the contents of the analog encoded digital data may itself explicitly provide the logic circuit 5 with the necessary information to identify when to begin the demultiplexed extraction of the compressed analog data segment from the multiplexed analog data stream The logic circuit 52 selects the analog logic block 76 by directing an analog to digital converter 54, operating at a reference frequency $f_2$, to initially receive and sequentially convert the compressed analog data segment to a corresponding digital representation for storage in a RAM block 56 as passed via data lines 68. The logic circuit 52 further controls digital to analog converter 58, operating at a reference frequency of $f_1$, to reconvert the digital representation of the compressed analog data segment, as obtained from the RAM block 56 via digital data lines 70 to provide analog decompressed data onto the analog output line 72.

By selection of the reference frequencies $f_1$ and $f_2$ as being the same frequencies for both the transmitter and receiver units 10, 80, the analog data provided by the receiver unit 80 is continuous and essentially identical to that originally provided to the transmitter unit 10. A preferred selection of values for the analog segment period $t_A$ the reference frequencies $f_1$ and $f_2$ and the digital data modulation data rate are given in Table 1.

TABLE 1

| | | |
|---|---|---|
| $t_A$ | Segment Period | 1 sec. |
| | $f_1$ Normal Sample Freq. | 16 kHz |
| | $f_2$ Compressed Sample Freq. | 18 kHz |
| $t_B$ | Digital Window | 0.11 sec. |
| $t_C$ | Compressed Segment Period | 0.89 sec. |
| | Digital Data Rate | 1200 bps |
| | Digital Data per Window | 133 bits |
| | Analog Compression Factor | 0.89 |
| | Bandwidth Increase Factor | 1.125 |

By converting each one second analog data segment at a conversion rate of 16 kHz and then reconverting back to an analog data segment at the higher conversion rate of 18 kHz, a compressed analog data segment having a period of 0.89 seconds is realized. This allows a digital data window to be effectively obtained in the original one second segment period without incurring a corresponding loss of analog data. Given that the modulator 20 analog encodes digital data at a nominal rate of 1200 bits per second, a maximum of 133 bits (0.11 seconds of analog encoded data) be multiplexed with the compressed analog data segment.

Figure 3E:
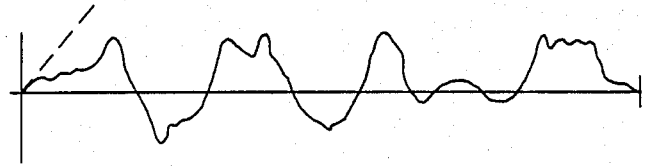

Consequently, the decompression of the compressed analog data segment, after being demultiplexed from the analog encoded digital data, yields a one second long analog data segment at a convenient rate of one analog segment per second. This resultant analog data segment is generally shown in FIG. 3e.

The compression of the analog data segment does increase the compressed analog data segment narrow bandwidth in direct proportion to the degree of compression. However, in practice, even conventional narrow communication network analog data channels have bandwidth limit definitions that are significantly greater than the analog data bandwidth required for the accurate transfer of the analog data given today's conventional filtering techniques. For example, a conventional telephone circuit has a defined bandwidth limit of 5 kHz. The human voice may be quite adequately communicated utilizing a bandwidth of little more than 3 kHz. An implementation of the present invention utilizing the values given in Table 1 accurately transfers the same 3 kHz bandwidth voice within an increased bandwidth of only 3.375 kHz. This increased bandwidth requirement is still well within the maximum defined for the telephone circuit.

Since most analog data channel bandwidth definitions were developed for a then existing practical state-of-the-art, current conventional analog data channel equipment requires no special modification or adaptation to be effectively utilized in combination with the present invention. Indeed, for the example generally described above, increases in the reference frequency $f_2$ and the digital data modulator data rate can be readily accommodated. As indicated in Table 2, the increased compression of the analog data segment yields a larger usable analog encrypted digital data window while only increasing the required compressed analog data bandwidth for a 3 kHz voice to 4.5 kHz. A phase-shift key analog encoding technique allows a 2400 bits per second digital data rate to be readily achieved also well within a 5 kHz maximum bandwidth. Consequently, an eight-fold increase in the digital data transfer rate is realized.

TABLE 2

| $t_A$ | Segment Period | 1 sec. |
|---|---|---|
| | $f_1$ Normal Sample Freq. | 16 kHz |
| | $f_2$ Compressed Sample Freq. | 24 kHz |
| $t_B$ | Digital Window | 0.33 sec. |
| $t_C$ | Compressed Segment Period | 0.67 sec. |
| | Digital Data Rate | 2400 bps |
| | Digital Data per Window | 800 bits |
| | Analog Compression Factor | 0.67 |
| | Bandwidth Increase Factor | 1.5 |

A preferred transceiver unit embodiment of the present invention, generally indicated by the reference numeral 90, is shown in FIG. 4. The transceiver unit 90, as shown, provides for half duplex operation through a single communication network data channel. Thus, a complete system would include a pair of transceivers 90, operating in complementary transmit and receive modes.

The digital control circuitry of the transceiver 90 includes a central processing unit (CPU) 92, program storage memory 94, clock unit 96, digital input/output (I/O) 98 and direct memory access (DMA) controller 102 respectively connected to an address, data, and control bus 100 by bus connect lines 126, 128, 130, 132, 142. The analog data path through the transceiver 90 is generally through an analog to digital converter 106, a random access memory (RAM) storage block 108 and a digital to analog converter 110. A modulator 112 and demodulator 120 provide an interface to the analog data path for use by the CPU 92. The remaining circuitry, including data route selectors 104, 114, transmitter 116, and receiver 118, complete the transceiver unit 90.

Figure 5:
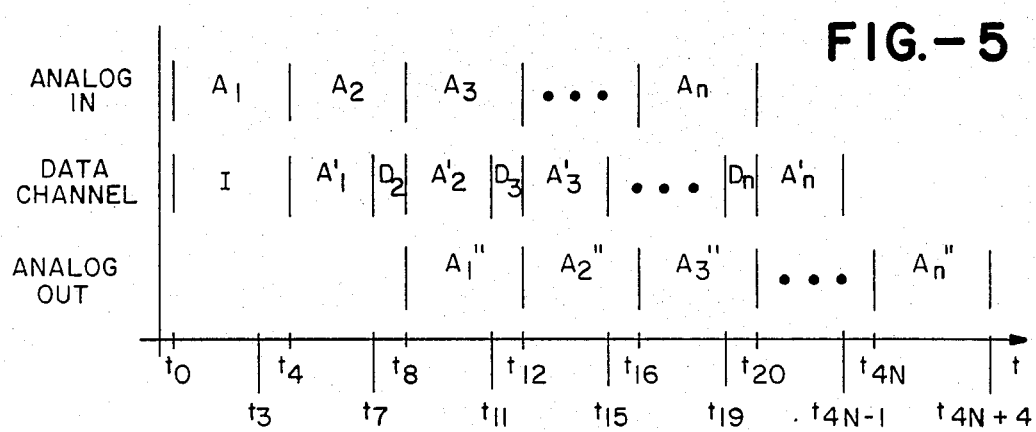
FIG. 5 is a data stream diagram illustrating the time relationship of the input analog data, network channel data stream, and the output analog data, each as associated with the operation of a preferred embodiment of the present invention.

In order to better understand the operation of the transceiver unit 90, reference is now made to FIG. 5. The analog input data stream to a transmitter mode transceiver unit 90 is shown as a continuous sequence of analog data segments $A_{1-n}$. For convenience of description, each analog data segment $A_{1-n}$ is illustrated as having a period of 4t. The corresponding data channel data stream provided by the transmitter mode transceiver unit 90 is shown beginning at $t_O$ with the transfer of an initialization block, I, followed by repeated sequences of compressed analog data segments uniformly multiplexed with analog encoded digital data blocks $D_{2-n}$ the initialization block logically includes the first data block $D_1$. The receiver mode transceiver unit 90 receives the data channel data stream to recover and decompress the compressed analog data segments $A'_{1-n}$ to provide a contiguous series of analog data segments $A''_{1-n}$.

Transmitter mode operation of the transceiver unit 90 shown in FIG. 4 is detailed in the flow diagram presented in FIGS. 6a–c. The transmit mode operation begins with the CPU 92 initializing the analog to digital and digital to analog converters 106, 110 and preparing a pair of segment storage frames in the RAM block 108. The CPU 92 has access to the RAM block 108 by buffered access to a secondary address, data, and control bus 144, 146, 148 coupled respectively to the address, data, and control inputs of the RAM block 108 by RAM bus connect lines 150, 152, 154. The CPU 92 prepares twin frames in the RAM block 108 for the storage of respective, digitized analog data segments. Where the input analog data is digitized at a rate of 16 kHz with one second segment periods, each of the two frames would be initialized to provide 16,000 digitized word-wide storage locations. The CPU 92 further initializes a pair of DMA channel controllers 122, 124 present within the DMA controller 102. The DMA channel controllers 122, 124 are specifically initialized with an address value pointing to the respective beginning storage locations of the respective RAM block frames and the number of data words contained in each.

The CPU 92 then programs the clock unit 96 to provide predetermined reference frequencies from A and B clock outputs. The A clock output is programmed to provide the reference frequency $f_1$ via clock line 138 to the first DMA channel controller 122 and to the analog to digital converter 106. The B clock output is programmed to provides the reference frequency $f_2$ via clock line 140 to the second DMA channel controller 124 and to the digital to analog converter 110. The acquisition of the first analog data segment is then initiated by the CPU 92 by providing a control signal on line 170 to selecting analog data arriving from the analog input line 174 for routing by the input selector 104 onto the input analog data line 180 of the analog to digital converter 106 and enabling the converter 106 to begin a continuous series of conversions. With each analog to digital conversion, the analog to digital converter 106 provides a request signal to the first DMA channel controller 122 via request/acknowledge lines 184. After internal arbitration between the DMA channel controllers 122, 124 within the DMA controller 102, an acknowledged signal is provided back to the analog to digital converter 106 from the first DMA channel controller 122, again via control lines 184. In response, the analog to digital converter provides its currently converted analog data digitized word value onto its output lines 182 and, therefore, onto the RAM block data bus 146. The first DMA channel controller 122 concurrently provides an address value and write access corresponding control signals onto the RAM block address and control buses 144, 148. The control signals provided by the first DMA channel controller 122 result in the analog data digitized word value being written into the input storage frame associated with the first DMA channel controller 122. The conversion and storage of analog data digitized values into the RAM block frame continues essentially unattended by the CPU 92.

Meanwhile, the CPU 92 initiates the transfer of an initialization data block, I, into the communication network data channel. This is accomplished by the CPU 92 by providing a control signal via control line 172 to an output selector 114 to select the output data line 192 of the modulator 112 and the transmitter input line 196. The CPU 92 then provides digital data to the modulator 112, via the CPU bus 100 and modulator bus interconnect lines 198 for analog encoding. This data may have originated, at least in part, form some device external to the transceiver 90, though connected to a digital data input line 134 of the I/0 unit 98 for transferring such data to the CPU 92. The analog encoded digital data in turn generated by the modulator 112 is passed by the output selector 114 onto the transmitter input line 192 of the transmitter 116. Where, for example, the transmitter 116 is a radio frequency transmitter, the analog data output from the output selector 114 is placed on an appropriate carrier frequency and transmitted effectively into the data channel 176.

Since the CPU 92 provides the digital data to the modulator 112 only at the rate at which the modulator 112 can analog encode the digital data, the CPU 92 is free to poll the status of the first DMA channel controller 122 between the provision of each digital word to the modulator 112. In particular, the CPU 92 polls the address count maintained by the first DMA channel controller 122 to determine when a complete analog data segment has been digitized and stored into input frame in the RAM block 108. Upon determining that a complete analog data segment has been digitized and stored, the CPU 92 temporarily suspends the operation of both the DMA controller 102 and analog to digital converter 106 to reprogram the respective DMA channel controllers with swapped initial address frame pointers. Thus, the digitized segment in the input frame is now logically present in the output frame within the RAM block 108. The CPU 92 then enables both channels of the DMA controller 102 and starts both the analog to digital converter 106 and the digital to analog converter 110. Further, the CPU 92 changes the control signal provided via control line 172 to the output selector 114 so as to now select the analog data output line 190 of the digital to analog converter 110

The digital to analog converter 110 operates in a substantially similar manner to the analog to digital converter 106 in the use of a request control signal to request digital data to convert. The request control signal is provided via request and acknowledge control lines 188 to the second DMA channel controller 124. An acknowledge control signal is passed back to the digital to analog converter 110 again via control lines 188 as the second DMA channel controller 124 provides an address and control signals onto the RAM block address and control buses 144, 148 via address and control lines 160, 162. The address corresponding location within the RAM block 108 is thereby accessed and provided out onto the RAM block data bus 146 via the RAM block data lines 152. On receipt of the acknowledged signal, the digital to analog converter 110 reads the digital word present on the RAM block data bus 146 via its digital input lines 186 and begins the analog conversion of the digital value. The resultant analog data is then provided onto the digital to analog converter output data line 190 to the output selector 114. As before, the analog data is routed via the selector output line 192 to the transmitter 116 for transfer into the data channel 176.

Since both the analog to digital converter 106, digital to analog converter 110 and both DMA channel controllers 122, 124 of the DMA controller 102 are all enabled essentially at the same time by the CPU 92, accesses to the RAM block 108 for storage and retrieval of data words must be interlaced to avoid access conflicts. Further, since the digital to analog converter and second DMA channel controller 124 operate in response to the reference frequency $f_2$ while the analog to digital converter 10 and first DMA channel controller 122 operate from the reference frequency $f_1$, the respective analog to digital and digital to analog conversions are not necessarily synchronized. However, by virtue of their common use of respective channel controllers of the DMA controller 102, the accesses to the RAM block 108 are, in fact, properly arbitrated. However, potential for loss of data while waiting for arbitration access grant is essentially precluded because the read/write access time of the RAM block 108 is on the order of 450 nanoseconds, if not much less, while the conversion period of the analog to digital and digital to analog converters 106, 110 are on the order of 10 microseconds, if not greater.

While the acquisition of a new analog data segment and the compression and transfer of a compressed analog data block proceed, the CPU 92 polls the status of the second DMA channel controller 124 to determine when the last of the output digitized data frame has been accessed and read from the RAM block 108. The operation of the second DMA channel controller 124 is then temporarily suspended and the CPU 92 polls the digital to analog converter 110 to determine the completion of the last conversion operation. When the last digital to analog conversion is completed by the digital to analog converter 110, the CPU again re-selects the output selector 114 to provide the output of the modulator 112 onto the selector output line 192. The CPU 92 then sequentially provides the digital data of a data block to the modulator 112 for analog encoding and subsequent transfer into the data channel. This digital data block is therefore effectively multiplexed into the communications network channel data stream. At the same time the CPU 92 also polls the first DMA channel controller 122 to determine the completion of the last analog to digital conversion and data storage operation into the input frame in the RAM block 108. Depending on whether additional analog data segments beyond the digitized segment now present in the RAM block 180 are to be transferred, the CPU 92 will provide a corresponding message as part of the digital data block being multiplexed. In any case, the CPU 92 temporarily halts the operation of the first DMA channel controller 122 and analog to digital converter 106 on completion of the acquisition and storage of the current analog data segment.

Assuming that there are further analog data segments to be transferred, the CPU 92 again programs the first and second DMA channel controllers with swapped initial frame address pointer values to again logically exchange the input and output data frames present within the RAM block 108. The CPU 92 then re-enables the analog to digital and digital to analog converters 106, 110 and the first and second DMA channel controllers 122, 124.

The process of acquiring an analog data segment while, at the same time, serially transferring out a compressed analog data segment followed by an analog-encoded digital data block is repeated until the CPU 92 determines that the last analog data segment for transfer into the data channel 176 has been acquired. Following this determination, the CPU 92 provides a last analog encoded digital data block with a command message indicating that the next-following compressed analog data segment is the last that will be currently transferred. Once acquisition of the last analog data segment is completed, the CPU 92 temporarily suspends the operation of the analog to digital converter 106 and first DMA channel controller 122. The second DMA channel controller 124 is then provided with the swapped initial address pointer value for the last remaining frame of digitized data in the RAM block 108. The output selector 114 is re-selected to couple the digital to analog output line 190 to the analog output line 192. The digital to analog converter 110 and second DMA channel controller 124 are then re-enabled. The last compressed analog data segment is, as before, passed via the digital to analog converter 110, output selector 114 and transmitter 160 into the data channel 176. Once the CPU 92 has determined that the last compressed analog data segment has been transferred into the channel 176 by polling of the second DMA channel controller 124, the CPU 92 suspends all operation of the DMA controller 102 and, shortly thereafter the digital to analog converter 110 after it completes its final digital conversion.

Figure 7A:
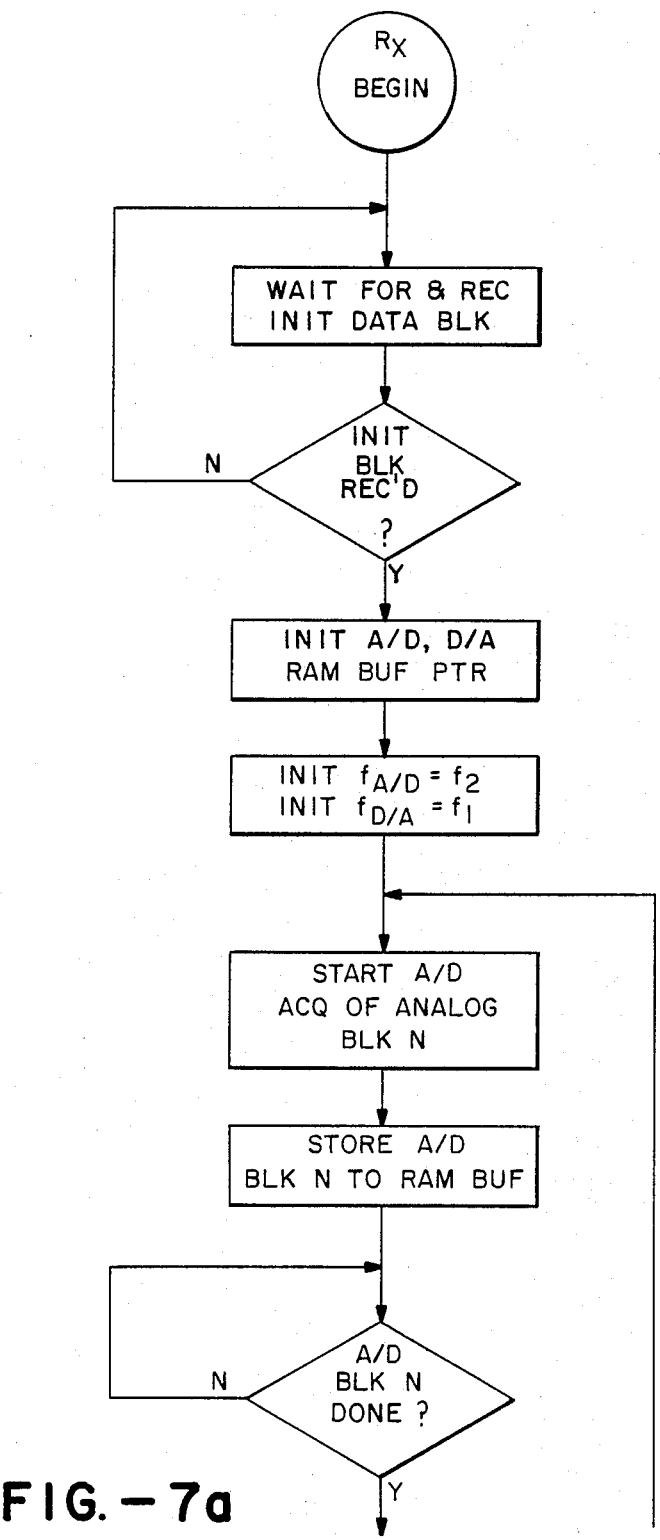
Figure 7C:
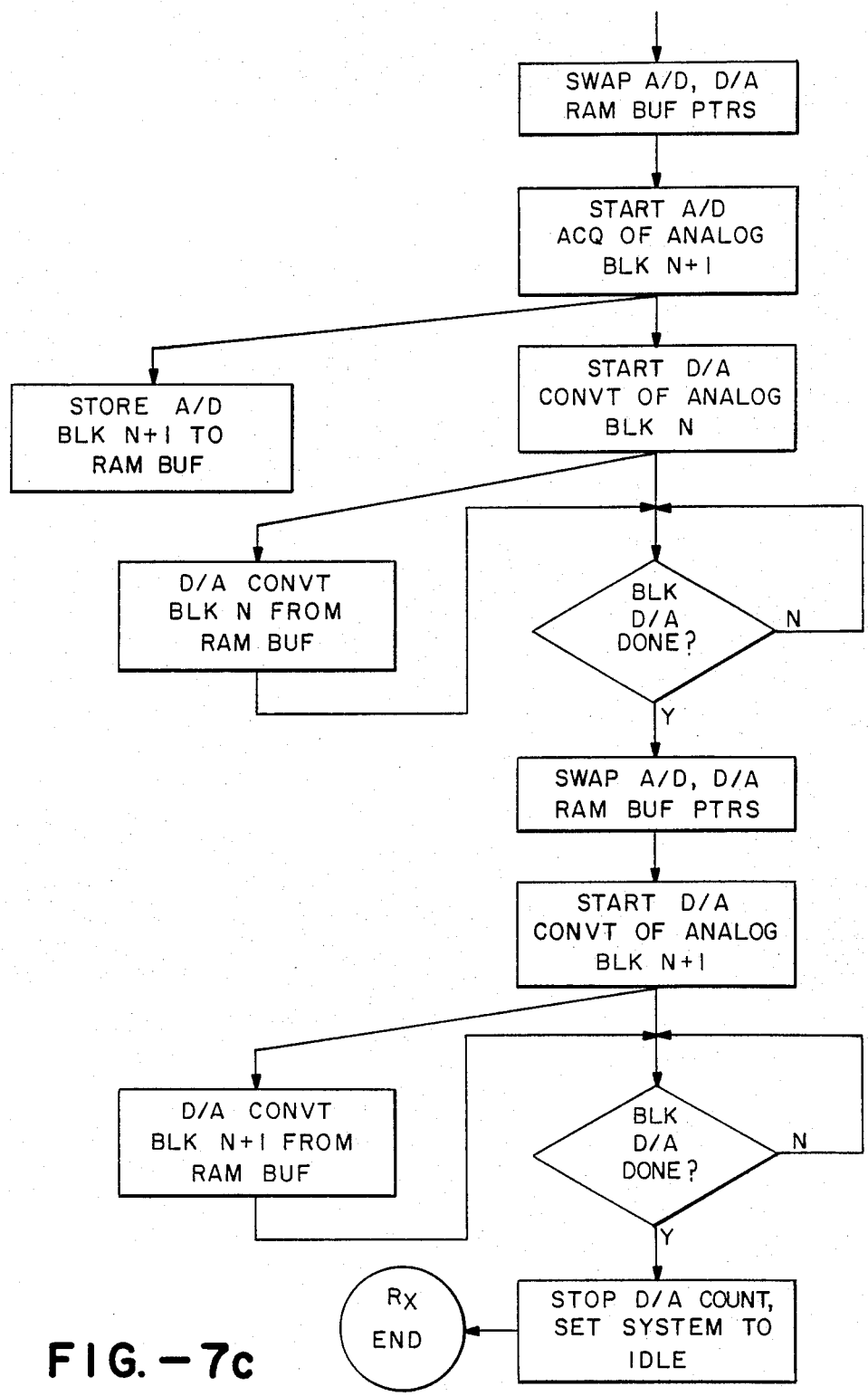

The operation of the transceiver unit 90, as a receiver, is detailed in FIG. 7a–c. In receiver mode, the CPU 92 awaits the beginning of a message by polling the status of the demodulator 120 to determine whether any valid analog encoded digital data is currently being received. Analog data from the data channel 176 is provided to the demodulator 120 via the receiver 118 and the receiver output line 178. The demodulator 120 includes conventional circuitry for determining whether the analog data being provided to the demodulator 120 conforms to the analog encoding standard to which the demodulator 120 conforms. Conventionally, the demodulator 120 sets a status bit in an internal demodulator status register readable by the CPU 92 upon beginning to validly demodulate digital data from the analog data being received. The CPU 92, upon polling and recognizing a demodulate-valid data received condition, reads in the resultant demodulated digital data via the demodulator output data lines 200 connected to the bus 100. The CPU 92 then determines, as this digital data is read in, whether a valid initialization data block, I, is being received. If not, the digital data is ignored and the CPU returns to polling for the receipt of a valid analog encoded data. When a valid initialization data block is finally received, the CPU 92 prepares the transceiver unit 90 for receiving and processing compressed analog and analog encoded data. To this end, the CPU prepares two compressed analog digitized data frames in the RAM block 108, initializes the DMA channel controllers 122, 124 with appropriate initial address pointer values and the clock unit 96 for providing the reference frequency $f_2$ from its clock output A onto the clock line 138 and the reference frequency $f_1$ from its clock output B onto the clock line 140.

Depending on the specific implementation of the present invention, the CPU 92 expects the beginning of the first compressed analog data segment at a predetermined period of time following the beginning of a data block, following the conclusion of a data block or at a time specified by a value transferred as data within a data block. Where receipt of the compressed analog data block is keyed to the beginning of the immediately preceding data block, the first or initialization data block, I, is separately recognized in terms of its length.

Since the demodulator is providing the data of the initialization data block at a rate on the order of one data bit per millisecond or less, the CPU 92 has quite adequate time to initialize the transceiver unit 90 for receive mode operation. Receive mode initialization is achievable generally independent of how the start point of the first compressed analog data segment is communicated. However, in a preferred embodiment of the present invention, the CPU 92 times the expected arrival of the first compressed analog data segment from the beginning of the initialization data block so as to afford the CPU 92 the greatest possible time to configure the transceiver 90 for receive mode and to obviate the use of any data within the initialization data block for timing purposes. The start of each compressed analog data segment thereafter will be time from the beginning of its immediately preceding data block $Dd_{2-n}$.

At the expected point in time for the receipt of the first compressed analog data segment, the CPU 92 provides a control signal via control line 170 to the input selector 104 to route the analog data received by the receiver 118 onto the input analog data line 180 of the analog to digital converter 106. The control signal provided on control line 172 also controls the output selector 114 to route analog data provided onto the digital to analog converter output line 190 onto the selector analog output line 194. The CPU 92 then enables the operation of the first DMA channel controller 122 and analog to digital converter 106. Since the reference frequency $f_2$ is being provided on the clock input of both the analog to digital converter 106 and DMA channel controller 122, the compressed analog data segment is acquired and digitized into the same number of digital data words as when it was first compressed. Accordingly, the digitized data storage frames in the RAM block 108 provide the same storage capacity as used in the transmit mode transceiver 90. Where the original analog data segment acquired by the transmitter mode transceiver unit 90 is at a reference rate of 16 kHz, the CPU 92 of the receiver mode transceiver unit 90 provides for two frames in the RAM block 108. Each frame has a digitized data capacity of 16,000 words. Since the analog to digital converter 106 and first DMA channel controller 122 are operating from the same reference frequency $f_2$, the compressed analog data segment is acquired from the data channel 176 at the same rate that it was originally transferred into the data channel 176.

While the first compressed analog data segment is being acquired, the CPU 92 polls the first DMA channel controller 122 to determine when the last digitized word of the compressed analog data segment has been stored into the input frame in the RAM block 108. The operation of the analog to digital converter 106 and first DMA channel controller 122 are temporarily suspended when the last digitized word has been received and stored. The CPU 92 then polls the demodulator 120 to wait for and then begin reading the digital data from the following multiplexed analog encoded digital data block. The CPU 92 is thus able to effectively re-synchronize the entire operation of the transceiver unit 90, in its receiver mode, to the multiplexing of the compressed analog and analog encoded data by the transmitter mode transceiver unit 90. Consequently, while the time bases of the respective transmitter and receiver mode transceiver units 90 may differ, the time difference accumulates for no more than a single analog data segment period of time. Given that conventional crystal controlled time bases have a tolerance of ten parts per million, the worst case difference in synchronization between the transmitter mode multiplexing and receiver mode demultiplexing of the compressed and analog encoded data is less than about 10 microseconds for any given one-second-long analog data segment.

In receiving the demodulated digital data from the demodulator 120, the CPU 92 determines whether a subsequent compressed analog data segment will follow. That is, data block command messages indicating that more compressed analog data segments are to be received or that one last analog data segment immediately follows is received and recognized by the CPU 92.

Where the command message indicates that further compressed analog data segments are to be received, the CPU 92 swaps the initial frame-address pointer values between the first and second DMA channel controllers 122, 124. After waiting for the predetermined period of time since the beginning of the analog-encoded digital data block, the CPU 92 enables the analog to digital and digital to analog converters 106, 110 and the first and second DMA channel controllers 122, 124. Thus, the next compressed analog data segment is acquired by the analog to digital converter 106 and stored in the input frame in the RAM block 108 while the previously acquired compressed analog data segment now present in the output frame of the RAM block 108 is analog converted by the digital to analog converter 110. The resultant analog data is provided through the output selector 114 onto the analog output line 194. Since the second DMA channel controller and digital to analog converter 110 are operated from the reference frequency $f_1$, the analog data segment processed is provided onto the analog output line 194 in essentially its original uncompressed form.

As before, the CPU 92 polls the first DMA channel controller 122 to determine when the current compressed analog data segment has been acquired and stored in the RAM block input frame. The next analog-encoded digital data block is then demultiplexed from the data channel. Between acquiring the demodulated data words of the data block from the demodulator 120, the CPU 92 also poles the second DMA channel controller 124 to determine when the last of the digitized analog data words has been read out of the output frame of the RAM block 108. When the last read access has completed, operation of the second DMA channel controller 124 is then suspended temporarily. This completes one complete acquisition and transfer of respective compressed and decompressed data segments.

If additional compressed analog data segments are to be received, the CPU 92 then repeats the cyclic process of swapping the initial frame address pointer values between the first and second DMA channel controllers 122, 124 and then enabling the analog to digital and digital to analog converters 106, 110 and DMA controller 102 to acquire the next compressed analog data segment and multiplexed analog-encoded data block while decompressing and outputting the prior-stored compressed analog data segment onto the analog data output line 194.

Significantly, the decompressed analog data segments provided onto the analog output line 194 each have essentially the same period as their corresponding analog data segments when provided to the transmitter mode transceiver unit 90. Also significant is that each decompressed analog data segment is provided essentially contiguously in series with one another to accurately reconstruct the original input analog data received by the transmitter mode transceiver unit 90.

When the command message provided in the analog-encoded digital data block indicates that a single, last compressed analog data segment is to follow, the CPU 92 controls one final, complete cycle of simultaneously acquiring a compressed analog data segment while decompressing and outputting the prior stored compressed analog data segment. The CPU 192 then swaps the initial frame address pointer values between the DMA channel controllers 122, 124 to logically ready the last compressed analog data segment for decompression and analog conversion. The second DMA channel controller 124 and digital to analog converter 110 ar then re-enabled. The CPU 92 polls the second DMA channel controller 124 to determine the completion of the last read access of the output frame in the RAM block 108. Once completed, the CPU 92 suspends all operation of the DMA channel controller 102 and polls the digital to analog converter 110 to determine when it has completed its final digital to analog conversion. The CPU 92 then halts the operation of the clock unit 96 to effectively idle the entire analog section of the transceiver unit 90.

Thus, a precise operation communication system that provides for the multiplexed transmission and reception of analog and digital data through a common narrow-band channel with accurate reproduction of the analog data at the receiver has been described.

Naturally, many modifications and variations of the present invention are possible in light of the above teachings. For example, the modulatation of the digital data to provide the analog encoded digital data blocks, I and $D_{2-n}$, may be done at an increased modulation rate, such as at an increased factor equal to the compression ratio of the compressed analog data segments. The result is that the analog encoded digital data blocks are effectively compressed prior to multiplexing. Thus, the same time window can be used to transfer a greater amount of analog encoded digital data. A similarly increased demodulation rate is used by the demodulator to accurately extract the digital data from the compressed analog encoded digital data block. It is therefore to be understood that, within the scope of the appended claims, the present invention may be practiced otherwise than as specifically described.

I claim:

1. A communication system for transferring first and second data through a data channel, said system comprising:
    (a) means for time compressing said first data;
    (b) means for analog encoding said second data, said analog encoding means including synchronization information with said second data; and
    (c) means for sequentially multiplexing said time compressed first data with said analog encoded second data to provide a multiplexed data stream wherein said synchronization information identifies the beginning of the next sequentially following multiplexed portion of said time compressed first data in said multiplexed data stream.

2. The system of claim 1, wherein said time compressing means time compresses said first data into a series of uniformly time compressed first data segments for respective multiplexing with portions of said analog encoded second data.

3. The system of claim 2 wherein said system includes a transmitter unit and a receiver unit, wherein said transmitter unit includes said compressing means, said providing means and said multiplexing means, and wherein said receiver unit comprises:
    (a) means, receiving said multiplexed data stream, for detecting said analog encoded second data;
    (b) means for demutiplexing said time compressed first data from said multiplexed data stream; and
    (c) means, receiving said time compressed first data from said demultiplexing means, for decompressing said time compressed first data.

4. The system of claim 3 wherein said demultiplexing means is responsive to said detecting means to synchronize said demultiplexing means with respect to the respective occurrence of said time compressed first data segments in said multiplexed data stream based on the synchronization information provided with said analog encoded second data in said multiplexed data stream.

5. The system of claim 4 wherein said detecting means includes means for extracting said analog encoding second data from said multiplexed data stream.

6. A communication system for transferring analog and digital data through an analog data channel, said system comprising:
 (a) means for multiplexing analog data to provide a multiplexed analog data stream;
 (b) means for compressing said analog data to provide a series of compressed analog data segments, said compressing means time compressing said analog data to periodically provide each of said compressed analog data segments, said compressing means providing said compressed analog data segments to said multiplexing means; and
 (c) means for analog encoding said digital data, said analog encoding means including synchronization data with the resultant analog encoded digital data, said analog encoding means providing said analog encoded digital data to said multiplexing means wherein said multiplexing means time multiplexes said analog encoded digital data between said compressed analog data segments.

7. The system of claim 6 further comprising means for controlling said multiplexer means to multiplex said analog encoded digital data into said multiplexed analog data stream in a predetermined time relationship with the multiplexing of the next said sequential compressed analog data segment.

8. The system of claim 7 wherein said multiplexer control means provides control data to said analog encoding means for inclusion as part of said analog encoded digital data and wherein said control data includes synchronization data specifying said predetermined time relationship between said analog encoded digital data and said sequential compressed analog data segments.

9. The system of claim 8 wherein said system receives additional digital data and wherein said multiplexer control means receives and provides said additional digital data to said analog encoding means for inclusion as part of said analog encoded digital data.

10. The system of claim 9 further comprising:
 (a) means for demultiplexing said compressed analog data and said analog encoded digital data from said multiplexed analog data stream;
 (b) means for detecting said analog encoded digital data and for extracting said synchronization data from said analog encoded digital data;
 (c) means, responsive to said synchronization data, for controlling said demultiplexing means to accurately demultiplex said compressed analog data from said multiplexed analog data stream.

11. The system of claim 10 further comprising means for decompressing said compressed analog data to provide said analog data, said decompressing means sequentially receiving said compressed analog data from said demultiplexing means.

12. The system of claim 11 wherein said detecting means includes means for analog decoding said analog encoded digital data to provide said digital data, said analog decoding means providing said digital data, including said control data, to said demultiplexer control means.

13. The system of claim 7 or 12 wherein said compressing means comprises:
 (a) means for storing data;
 (b) first converter means for analog to digital converting said analog data at a first conversion rate to provide digitized analog data to said data storage means;
 (c) second converter means for digital to analog converting said digitized analog data at a second conversion rate to provide said compressed analog data;
 (d) compression control means for controlling the storage of digitized analog data into said data storage means at said first conversion rate and for providing said digitized analog data from said data storage means to said second converter means at said a second conversion rate; and
 (e) means for generating first and second conversion control signals at said first and second conversion rates, sai first and second conversion control signals being provided to said first and second converter means, respectively.

14. The system of claim 13 wherein said compression control means provides for the arbitrated, asynchronous storage and retrieval of respective digitized data from said data storage means.

15. The system of claim 14 wherein said compression control means directs the storage of digitized analog data to an input data storage frame while directing the retrieval of digitized analog data from an output data storage frame, where said input and output data storage frames have like numbers of digitized analog data storage locations, and wherein said compression control means provides for the logical swapping of said input and output digitized analog data storage frames within said data storage means.

16. The system of claim 15 wherein said system includes a like pair of data transceiver units and wherein each said data transceiver unit further comprises:
 (a) a transceiver controller that includes said multiplexer control means and said demultiplexer control means; and
 (b) an analog section that includes said compression means and said decompression means.

17. The system of claim 16 wherein said generating means is responsive to said transceiver controller for the selection of the conversion rate specified by said first and second conversion control signals such that said compression means of said analog section means is operable as said decompression means by said transceiver controller.

18. A transceiver for transferring data between a host and a data channel, said transceiver comprising:
 (a) compression means for compressing analog data received from said host into compressed analog data segments and for decompressing compressed analog data segments prior to transfer to said host;
 (b) control means for analog encoding digital data to provide analog encoded digital data segments, said control means providing said analog encoded digital data segments with synchronization data; and
 (c) multiplexer means for multiplexing said compressed analog data segments from said compressed means with said analog encoded digital data segments to provide a data channel data stream and, responsive to said synchronization data, for demultiplexing said data channel data stream to provide said compressed data segments to said compression means for decompression.

19. The transceiver of claim 18 further including detecting means for detecting the occurrence of said synchronization data in said data channel data stream, said control means being coupled to said detecting means for determining whether said detecting means has detected said synchronization data.

20. The transceiver of claim 19 wherein said synchronization data includes timing information relating to the multiplexed occurrence of said compressed data segments in said data channel data stream.

21. The transceiver of claim 20 wherein said synchronization data further includes control data.

22. The transceiver of claim 21 wherein said compression means compresses analog data and decompresses compressed analog data segments.

23. The transceiver of claim 22 wherein said transceiver exchanges digital data with said host and wherein said control means provides analog encoded blocks of said digital data, including said control data, to said multiplexer means.

24. The transceiver of claim 23 wherein said transceiver exchanges analog data with said host, said control means further comprising:
modulator means coupled to said multiplexer means, for analog encoding said digital data prior to being provided to said multiplexer means and for analog decoding said digital data from corresponding demultiplexed portions of said data channel data stream.

25. The transceiver of claim 24 wherein said synchronization data is the time relationship between the occurrence of said control data and the following multiplexed said compressed data segment.

26. The transceiver of claim 25 wherein said compression means comprises:
(a) means for analog to digital converting either said analog data or said compressed analog data segments to provide digitized analog data;
(b) means for storing said digitized analog data;
(c) means for digital to analog converting said digitized analog data;
(d) means for managing the transfer and storage of digitized analog data in said storing means and for accessing and transferring said digitized analog data from said storing means to said digital to analog converting means; and
(e) means for generating first and second conversion rate control signals for respective provision to said analog to digital converter and said digital to analog converter, the relative frequencies of said first and second conversion rate control signals determining whether said analog data is compressed or said compressed analog data segments are decompressed.

27. A communication system for transferring analog and digital data through an analog data channel, said system comprising:
(a) means for time compressing said analog data to provide a periodic series of compressed analog data segments;
(b) means for analog encoding said digital data;
(c) means for multiplexing analog data to provide a multiplexed analog data stream, said multiplexing means receiving said periodic series of compressed analog data segments from said compressing means and said analog encoded digital data from said analog encoding means, said multiplexing means multiplexing said analog encoded digital data between successive segments of said periodic series of compressed analog data segments, said multiplexer means multiplexing said analog encoded digital data into said multiplexed analog data stream in a predetermined time relationship with the multiplexing of the next segment of said periodic series of compressed analog data segments.

28. The system of claim 27 wherein said multiplexer control means provides control data to said analog encoding means for inclusion as part of said analog encoded digital data and wherein said control data may include synchronization data specifying said predetermined time relationship between said analog encoded digital data and said sequential compressed analog data segments.

29. The system of claim 28 wherein said system receives additional digital data and wherein said multiplexer control means receives and provides said additional digital data to said analog encoding means for inclusion as part of said analog encoded digital data.

30. The system of claim 29 further comprising:
(a) means for demultiplexing said periodic series of compressed analog data segments and said analog encoded digital data from said multiplexed analog data stream;
(b) means for detecting said analog encoded digital data, said detecting means extracting said control data from said analog encoded digital data;
(c) means, responsive to said control data, for controlling said demultiplexing means to accurately demultiplex said periodic series of compressed analog data segments from said multiplexed analog data stream.

31. The system of claim 30 further comprising:
means for decompressing segments of said periodic series of compressed analog data segments to provide said analog data, said decompressing means sequentially receiving segments of said periodic series of compressed analog data segments from said demultiplexing means.

32. The system of claim 31 wherein said detecting means includes means for analog decoding said analog encoded digital data to provide said digital data, said analog decoding means providing said digital data, including said control data, to said demultiplexer control means.

33. The system of claim 27 or 32 wherein said compressing means comprises:
(a) means for storing data;
(b) first converter means for analog to digital converting said analog data at a first conversion rate to provide digitized analog data to said data storage means;
(c) second converter means for digital to analog converting said digitized analog data at a second conversion rate to provide said compressed analog data;
(d) compression control means for controlling the storage of digitized analog data into said data storage means at said first conversion rate and for providing said digitized analog data from said data storage means to said second converter means at said second conversion rate; and
(e) means for generating first and second conversion control signals at said first and second conversion rates, said first and second conversion control signals being provided to said first and second converter means, respectively.

34. The system of claim 33 wherein said compression control means provides for the arbitrated, asynchronous storage and retrieval of respective digitized data from said data storage means.

35. The system of claim 34 wherein said compression control means directs the storage of digitized analog data to an input data storage frame while directing the retrieval of digitized analog data from an output data storage frame, where said input and output data storage frames have like numbers of digitized analog data storage locations, and wherein said compression control means provides for the logical swapping of said input and output digitized analog data storage frames within said data storage means.

36. The system of claim 35 wherein said system includes a like pair of data transceiver units and wherein each said data transceiver unit further comprises:
 (a) a transceiver controller that includes said multiplexer control means and said demultiplexer control means; and
 (b) an analog section that includes said compression means and said decompression means.

37. The system of claim 36 wherein said generating means is responsive to said transceiver controller for the selection of the conversion rate specified by said first and second conversion control signals such that said compression means of said analog action means is operable as said decompression means means by said transceiver controller.

* * * * *